July 23, 1946.  A. C. DAVIDSON  2,404,475
RAILWAY TRUCK SPRING BRAKE
Filed Sept. 22, 1943
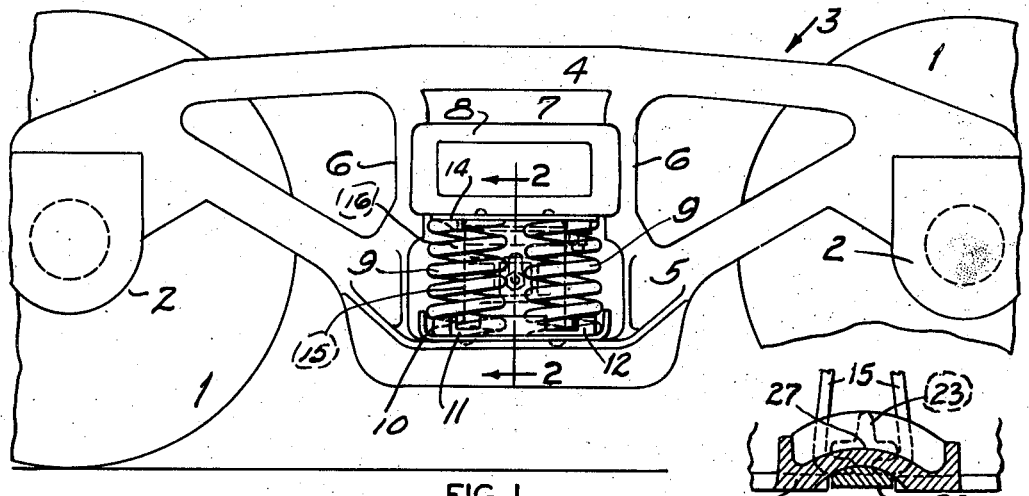
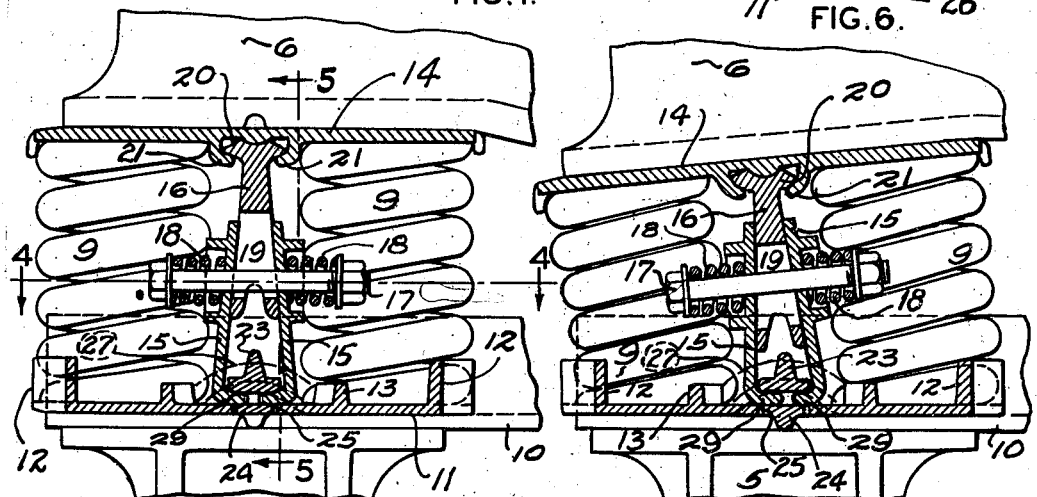
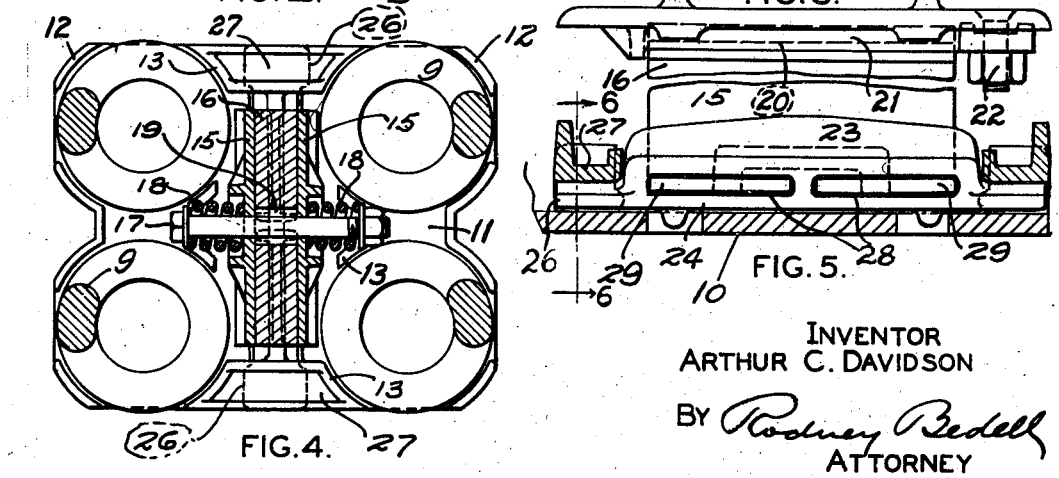
INVENTOR
ARTHUR C. DAVIDSON
BY Rodney Bedell
ATTORNEY Patented July 23, 1946

2,404,475

UNITED STATES PATENT OFFICE 2,404,475

RAILWAY TRUCK SPRING BRAKE

Arthur C. Davidson, Chicago, Ill.

Application September 22, 1943, Serial No. 503,389

10 Claims. (Cl. 267—4)

The invention relates to the control of railway truck springs and consists in a spring brake or dampening device and associated structure intended primarily for use in a truck of the type in general use in railway freight cars.

The main object of the invention is to prevent undesirable rebound action of the bolster springs which give the vehicle rough riding characteristics tending to damage lading and to derail the truck.

Another object is to effect the desired snubbing of the rebound action without substantially interfering with the initial compression action of the springs which should be soft to maintain easy riding qualities of the truck and especially to protect light loads on which 71% of all damage claims paid by railroads are due to lack of proper snubbing action while cars are in transit.

Another object is to facilitate the installation and replacement of spring brake or snubbing parts which may require renewal.

Another object is to provide friction plates of large surface to resist rapid wear and insure long life of unit.

Another object is to provide for the assembly of a spring brake without requiring substantial change and with a minimum amount of work on the associated truck parts.

These and other detail objects of the invention as will appear from the following description are attained by the structure illustrated in the accompanying drawing, in which—

Figure 1 is a side elevation of a four-wheel truck for railway cars including the novel spring brake device characterizing the present invention.

Figure 2 is a detail vertical section taken on the line 2—2 of Figure 1 and drawn to a larger scale.

Figure 3 is a similar section showing the parts in a different position.

Figure 4 is a horizontal section taken on the line 4—4 of Figure 2.

Figure 5 is a detail vertical section taken on the line 5—5 of Figure 2.

Figure 6 is a detail section taken approximately on the line 6—6 of Figure 5.

The truck includes the usual axle-mounted wheels 1, journal boxes 2 and side frames 3 which may be integral with the journal boxes or assembled with separately formed journal boxes. Each side frame includes a compression member 4, a tension member 5 and spaced struts or columns 6 cooperating with the middle portions of members 4 and 5 to form a window 7 for the bolster 8 and for bolster-supporting springs 9 which are supported from the intermediate portion of the tension member 5. Preferably, a spring plank 10 extends between side frames 3 at opposite sides of the truck and a spring seat or carrier 11 is mounted on each end of spring plank 10. This spring carrier has upstanding lugs 12 and 13 for positioning the truck springs. A spring cap 14 is mounted on springs 9 and supports the end of bolster 6.

A pair of friction plates 15 are pivotally secured to spring carrier 11 by an arrangement described in detail below and extends upwardly therefrom and receives between them a friction plate 16 depending from spring cap 14. A bolt 17 disposed horizontally extends through friction plates 15 and 16 being carried by plates 15, and tensioning springs 18 are compressed between each end of the bolt and the adjacent plate 15, thus thrusting plates 15 towards each other and clamping plate 16 between them. Plate 16 has a slot 19 elongated vertically to accommodate relative vertical movement of plate 16 and plates 15 in which the bolt is seated.

Plate 16 is wedge-shaped with its sides converging upwardly so that the friction between the plates during the rebound or expanding movement of bolster springs 9 is substantially greater than the friction offered during compression of springs 9. The amount of friction provided during compression of the springs and during expansion of the springs may be controlled and varied as desired by adjusting the tension on springs 18 and by predetermining the angle of convergence of the sides of plate 16.

It is desirable that the friction plates have pivotal movement to the side frame and bolster with which they are associated. To accommodate this requirement, the upper end of plate 16 is of T section with the lateral arms 20 curved as indicated and cap 14 has similar arcuate lugs 21 cooperating with the underface of the cap to form an elongated recess into which the upper portion of plate 16 may be slid lengthwise and may be retained against removal by a locking bolt 22. Cap 14 and plate 16 may tilt relative to each other, as indicated in Figure 3, to accommodate relative lateral movement of the bolster and side frame or tilting of the bolster in a transverse vertical plane relative to the side frame or a combination of these relative movements.

Plates 15 are anchored to spring carrier 11 by an elongated member which includes a bar 24 extending from side to side of carrier 11 and received in a slot 25 provided in the latter. The ends 26 of bar 24 extend beneath upwardly recessed portions 27 of carrier 11 at the ends of slot 25 and the anchoring device is thereby positioned and held in assembled relation with the spring carrier and spring plank and side frame. The body portion 23 of the anchoring device extends upwardly from bar 24 and is recessed laterally at 28 to receive inturned flanges 29 on the lower ends of plates 15 to form a bearing and resist the upper thrust of plates 15.

With this assembly, plates 15 may pivot about carrier 11 to accommodate the relative movement of the parts as described above. The single tension device bolt 17 passing through plates 15 and 16 readily accommodates the relative tilting of the plates in their general vertical plane so that the bolster, as seen in Figure 1, may rock relative to the truck frame to the extent permitted by its fit between the bolster columns 6, and the friction device is not subjected to any strain from such rocking movement of the bolster.

If desired, the elements of the spring carrier and spring cap may be made integral with the spring plank and the bolster or the parts of the spring carrier may even be made integral with the side frame (as in a spring-plankless truck) and, if desired, the anchoring device 23, 24 may be made integral with the spring carrier or spring plank or side frame, and other variations in the construction may be made all without departing from the spirit of the invention.

What is claimed is:

1. In a device of the class described, a member for seating truck springs, a cap member for supporting a truck bolster on the truck springs, a pair of plates extending abreast of each other and substantially vertically from one of said members and individually pivotally secured thereto, a single plate extending substantially vertically from the other of said members and pivotally secured thereto and received between said pair of plates, and spring means yieldingly thrusting the pair of plates towards each other to frictionally engage the opposing surfaces of the other plate.

2. A structure as described in claim 1 in which the means clamping the plates together comprises a bolt extending substantially horizontally through the plates and supported by at least one of the plates, there being a coil spring between each end of the bolt and the adjacent plate.

3. A device as described in claim 1 in which the plates and spring means are inclinable as a unit relative to the bolster-supporting cap member to accommodate shifting of a bolster mounted on the cap member relative to the spring seat member without substantial movement of the plates relative to each other.

4. A device as described in claim 1 in which the connection between the cap member and the remainder of the device includes elements slidable on each other horizontally and providing for movement of the cap member, laterally with respect to the remainder of the device without substantial movement of the frictionally engaged plates relative to each other.

5. A structure as described in claim 1 in which the frictionally engaged surfaces of the plates diverge towards the spring seating member, whereby the device offers substantially greater resistance to the movement of the plates during movement of the members away from each other than during movement of the members towards each other.

6. In a railway truck spring brake, a spring carrier, a plurality of coil springs seated on said carrier, a cap member resting on said springs and arranged to support a truck bolster, said cap member having a depending lug extending across the member transversely of the bolster and substantially at the middle of the member and slotted from one end towards the other end, a friction plate having a head slidably received in said slot, there being an upstanding part extending across the carrier in the same general vertical plane as said depending lug on the cap member and recessed laterally, friction plates having their lower ends flanged and received in the recess in said part, said plates overlapping said first-mentioned friction plate, and yielding means carried on said plates and thrusting them into frictional engagement with each other.

7. In a railway truck spring brake structure, a spring carrier plate having spaced areas for mounting springs and having an elongated slot between said areas, there being upstanding lugs at the ends of said slot each having an upwardly extending recess in its lower surface opening towards the other lug, a friction device anchor member positioned in said slot with its ends received in said recesses, said member, between its ends, extending upwardly above the level of the plate and having laterally opening recesses for receiving horizontal flanges on the lower ends of upright friction plates.

8. An anchor for a railway truck spring brake including a spring carrier with laterally and downwardly opening recesses near opposite sides and an upright friction plate above the same with a hooked lower end, the anchor comprising an elongated member with ends receivable in said recesses and arranged between its ends to project above the level of said ends and there recessed laterally to receive the hooked lower end of the friction plate and anchor the same to the carrier.

9. An anchor for a railway truck spring brake including a spring carrier with laterally and downwardly opening recesses near opposite sides and a pair of upright friction plates with hooked lower ends facing towards each other, the anchor having narrow end portions adapted to be received in said recesses and also having a downwardly facing bar spaced above the level of said end portions to form an elongated recess opening in opposite directions to receive the oppositely facing hooked lower ends of the friction plates.

10. In a railway truck spring brake structure, a spring carrier plate having spaced areas for mounting springs and having an elongated slot between said areas, there being upstanding lugs at the ends of said slot each having an upwardly extending recess in its lower surface opening towards the other lug, a friction device anchor member positioned in said slot with its ends pivotally received in said recesses, and an upright friction plate structure secured to said anchor member.

ARTHUR C. DAVIDSON.